United States Patent [19]

Gerharz

[11] Patent Number: 4,517,569
[45] Date of Patent: May 14, 1985

[54] PASSIVE RETROREFLECTIVE DOPPLER SHIFT SYSTEM

[75] Inventor: Reinhold Gerharz, Bethesda, Md.

[73] Assignee: The United States of America as represented by the Secretary of the Army, Washington, D.C.

[21] Appl. No.: 349,493

[22] Filed: Feb. 17, 1982

[51] Int. Cl.³ .................. G01S 13/58; H01Q 15/16
[52] U.S. Cl. ........................ 343/18 D; 343/8
[58] Field of Search ............ 343/18 D, 18 C, 18 B, 343/8; 350/99, 102 (U.S. only), 104 (U.S. only)

[56] References Cited

U.S. PATENT DOCUMENTS

| | | | |
|---|---|---|---|
| 2,391,914 | 1/1946 | McElhannon | 343/18 D |
| 2,443,643 | 6/1948 | Schelleng | 343/18 D |
| 2,461,005 | 2/1949 | Southworth | 343/18 D |
| 3,019,430 | 1/1962 | Pedersen et al. | 343/18 D |
| 3,154,784 | 10/1964 | Allen | 343/18 D |
| 3,158,862 | 11/1964 | Chisholm | 343/18 D |
| 3,305,863 | 2/1967 | Jacobs | 343/18 D |
| 3,660,843 | 5/1972 | Wolff | 343/18 D X |
| 4,233,605 | 11/1980 | Coleman | 343/18 D |
| 4,370,654 | 1/1983 | Krutsch | 343/18 D |

Primary Examiner—T. H. Tubbesing
Assistant Examiner—John B. Sotomayor
Attorney, Agent, or Firm—Anthony T. Lane; Robert P. Gibson; Max L. Harwell

[57] ABSTRACT

A retroreflector system which permits the superposition of wide-band doppler-shifts upon a signal incident on a retroreflective device before the search signal is reemitted and returned to the signals source of origin. The retroreflector system has a multisurfaced retroreflective device having at least one activated reflective surface along with other rigid surfaces in which the activated reflective surfaces have vibrational and/or rotational movement imposed thereon by modulating means to establish doppler shifted components to the reemitted search signal.

3 Claims, 4 Drawing Figures

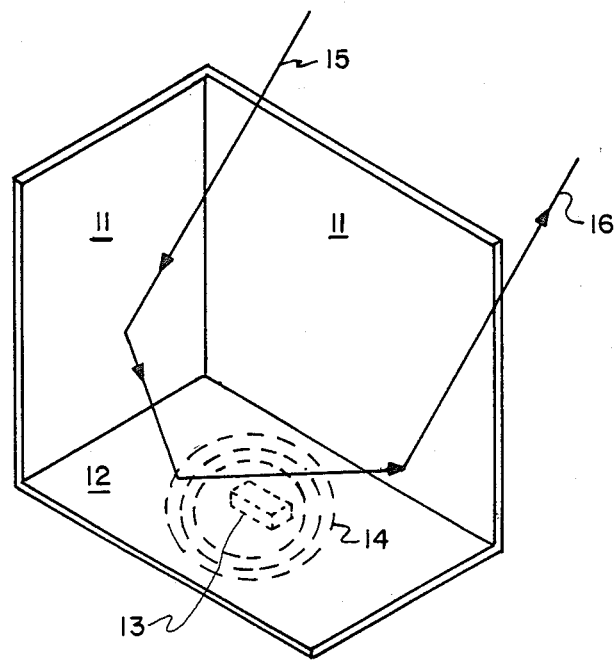
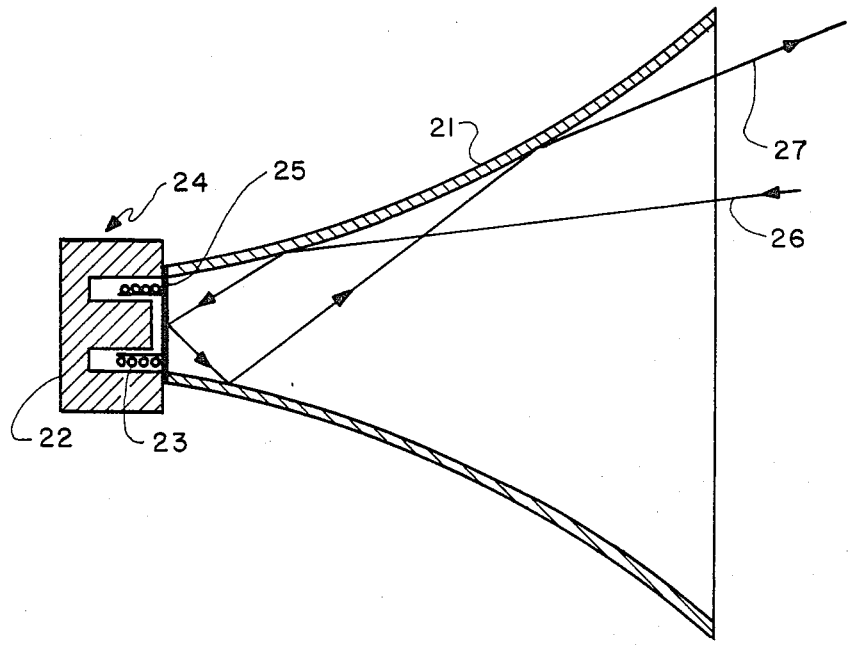
FIG. 1
FIG. 2

PASSIVE RETROREFLECTIVE DOPPLER SHIFT SYSTEM

The invention described herein may be manufactured, used and licensed by the U.S. Government for governmental purposes without the payment of any royalties thereon.

BACKGROUND OF THE INVENTION

1. Field of the Invention

The invention is in the field of reflecting devices of the retroreflector type in which at least one of the sequence of reflective surfaces, forming the retroreflector, is activated to superpose a doppler shift on the return signal reflected therefrom toward the transmitter of the original entrance signal.

2. Description of the Prior Art

Passive retroreflective devices for electromagnetic radiation, in contrast to active responders, return an essential part of the received energy back into the direction of its origin. The most common types of passive retroreflectors are found in the optics of traffic warning signals and consist of optical retroreflector elements such as corner reflectors, cat's eye lenses, or of arrays made of these reflector elements. For the microwave radio region, one or several elements of such arrays may suffice for effectively returning most of the incoming radiation if the elements are much enlarged. The efficiency of any reflector element depends primarily on the reflectance of its active surface area and on its gross aperture. It has become practicable in testing operations to compare the reflected energy from a target with that from a large metal sphere of a specified radius. In the $10^9$ Hz ($\lambda = 3$ cm) region, for instance, the return radiation from a corner reflector of 10 cm aperture corresponds roughly with that of a reflecting sphere of about 10 meters radius. The amount of energy reflected from such a device is of the same order of that reflected from the entire front end or rear end of ordinary motor vehicles.

In true-range power tests, the present state of technology leans heavily on stationary corner cube reflectors, but if doppler-shifted signals are to be tested or superposed upon the search beam an auxiliary target is usually placed quite close to the transmitter and is moved back and forth in beam direction. Accordingly, doppler-testing is performed in the transmitter's near field, where signal power levels are often excessive and where minute reflecting components often suffice. However, true-range testing and target searches will always require precise and synchronous tracking of all movements and speeds of the target object by other means also.

Prior testing art for small doppler-shifts consists of using tower mounted corner reflectors for beam and target marking wherein there was no simple doppler-shifting device available. Operators also use active frequency shifted responders for microwave link testing. However, most of these responders are not at all designed for mobile target simulations. Another testing method that is used employs on-board vehicle speed-scribers and recorders for such telemetry projects and their subsequent motion analysis. In testing and other activities of modern motion-detecting radar devices, the combination of the measured energy level with true-range indication of the returning signal, together with a predetermined superimposed doppler-shift of known magnitude, has now become a very desirable measurement feature. This aspect of true-range mobile target tests has remained little-explored. It is one purpose of this invention to combine ordinary passive retroreflecting testing components with the option to superimpose on the primary beam selected signals doppler shifts of a known magnitude for simulating the movement of a distant target together with its indicated range.

SUMMARY OF THE INVENTION

The present invention permits the superposition of doppler-shifts on a retroreflected search signal with a minimum of active telemetry or responder techniques involved. The invention also simplifies range tests by introducing doppler-shifts of known magnitudes and by using retroreflective devices that are modified from other reflector types.

The novel art comprises a retroreflective device which superposes a doppler-shifted signal on the original carrier of the search beam, before it becomes re-emitted from the device and returned to its place of origin. The doppler-shifted signal is provided by an active member or members of the retroreflective device. The active members have vibrational and/or rotational motions applied thereto which minutely displace one of the components of the retroreflective device. The returned search beam will therefore carry doppler-shifted signal components back to its emitter, indicating movements of the targeted retroreflective device. This shift may be measured and analyzed in terms of a linear motion of the retroreflective device, even though the device itself may remain stationary with respect to its environment. The moving, i.e., rotating or vibrating, reflective surfaces of the signal retroreflective device may be controlled or modulated by some modulating means, such as electro-magnetically, by small motors, by acoustical excitation, by pneumatics, or by clockwork driven mechanisms, etc.

New features of the present doppler-shift system are enhanced signal reflection by retroreflective components and the introductions of a plurality of frequency shifts, i.e., doppler-shifts, while the search beam is retroflected by the non-cooperating target vehicle, i.e., retroreflective device. Another feature is that no additional electronic or telecommunication components are necessary for doppler-shifting the primary beam.

In the field of microwave radar, most retroreflective devices make use of plane-surface resonant dipole strips ("chaff"), reflectors dishes, or cavity reflectors. The cavity reflectors may have the form of trihedral corner cubes, parabola or cavity horns. Curved reflector surfaces usually guide the radiation through a focal region, before returning the radiated energy in the direction of the primary emitter. In all focusing reflectors, beam modification for generating doppler-shifted signals may therefore be best achieved in or near this focal region.

The doppler-formula is based on the velocity of light, i.e., $c = 3 \times 10^{10}$ cm/sec. The carrier frequency, $f_c$, of the radiation emitted by the non-moving source will change to a doppler frequency, $f_d$, when the signal is reflected from an object that moves with the speed v relative to the emitter. Accordingly, $f_d = f_c\, 2\, v/c$. For typical carrier frequencies near $10^{10}$ Hz and for a simulated (1) object moving with the speed v, the returned signal is arriving back at the transmitter with the shifted frequency $f_d$. Such frequency shifts, $f_d$, are indicated in the following TABLE 1. When the modulated activated surface indicates a velocity of 10 Km/h and the carrier frequency is $10^{10}$, the doppler-shift frequency would be 2000 Hz. Sealing is a convenient way to handle other microwave frequencies and typical velocities of moving targets. A velocity of 100 Km/h would require a speed of 2750 cm/sec of the area of signal reflection. TABLE 1 below shows the various frequency shifts $f_d$ for the various carrier frequencies $f_c$ with the simulated object moving at the designated speed v.

TABLE 1

| v = 100 Km/h    | $f_c$ = | $3.10^9$ | $10^{10}$ | $2.10^{10}$ | Hz |
|-----------------|---------|----------|-----------|-------------|----|
| or 2750 cm/sec  | $f_d$ = | 550      | 2000      | 4000        | Hz |

According to these parameters, the detection of the primary doppler-shift from vehicles that travel with the speed v may be achieved with simple audio frequency recorders. Objects that move much slower, say about 10 Km/h, would obviously require a carrier frequency $f_c$ of the search signal that should be considerably higher, if the convenience of audio-frequency tracking methods is to be maintained. The object velocity of v=100 Km/h that applies as shown in TABLE 1 may be simulated through means of mechanical modulation, if a strong retroreflected signal can be maintained with that technique.

The mechanical modulation feature is part of the invention and it may be achieved by combining mechanical vibrations and/or rotations with means to produce strong retroreflection. In one possible and practicable method, the modulator is placed right into the focal region of the retroreflector, and the mechanical modulator assumes the role of simulating the motion of the real object. The mechanical motion of the modulator may be achieved by two approaches, such as (1) a motor-driven metallic vane which is inserted into the focal region of the retroreflector and is rotated at high frequencies, or (2) a metallic membrane reaching into the focal region and vibrating at sound frequencies. The metallic vane may be better for the production of one discrete frequency band, while a sound-excited membrane can superpose a plurality of frequency components or bands of a returning doppler-shifted search signal.

When a rotating metallic vane is used, its size should be kept rather small since it needs to spin at a high rate. The reflecting portions of the vane will introduce the desired doppler-shift by means of the relative rotational velocity of the vane. This amount of the doppler-shift also depends on the distance of the signal reflecting portion of the vane from its spin axis. As stated above, a velocity of 100 Km/h would require a speed of 2750 cm/sec of the area of signal reflection on the moving vane. If said distance would amount to 1 cm from the spin axis, the doppler frequency would become $v/2\pi r = 2750$ cm/sec$\cdot 2\pi\cdot 1$ cm$= 444$ Hz. Such a high rate of rotation may exceed the speed of many presently available low-cost rotating devices. It may therefore be more practicable to utilize acoustically excited membranes for some of the frequency bands shown in TABLE 1. A modulator of this type may be constructed by employing modern, high frequency, funnel-shaped loudspeakers of the tweeter type and by coupling the sound vibrations to a stationary vane in the focal region of the retroreflector. Another modulator may be constructed by sound-excitation of one or more of the three reflector mirrors of a corner cube, or trihedral, reflector. A still further embodiment may arrange for one of the trihedral reflector components to rotate in its own plane at the desired speed. It is also possible to combine any or all methods.

BRIEF DESCRIPTION OF THE DRAWINGS

FIG. 1 illustrates a trihedral retroreflective device used in the present inventive system;

FIG. 2 shows in cross-section a horn retroreflective device;

DETAILED DESCRIPTION OF THE EMBODIMENTS

Figure 3:
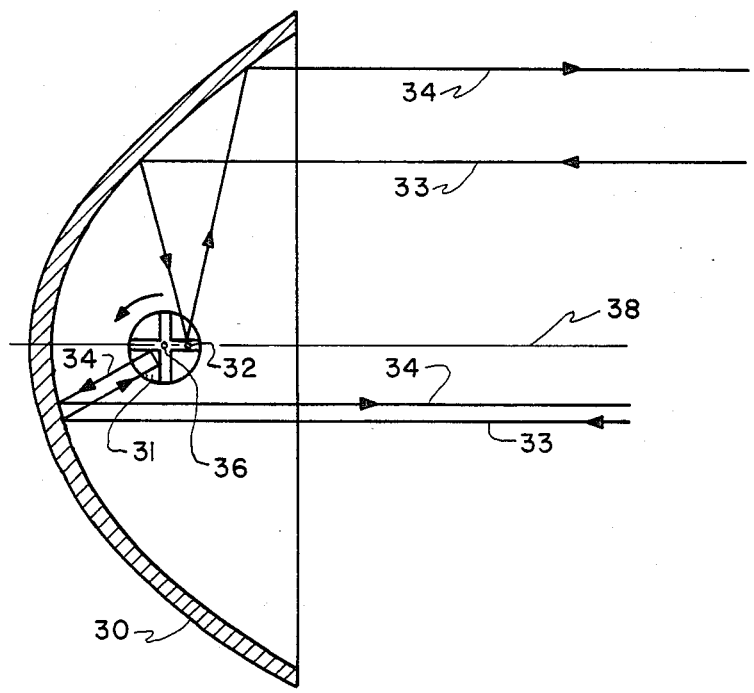
FIG. 3 illustrates a side view of a parabolic dish retroreflective device using a rotating vane modulator.

All four embodiments of the retroreflective devices as shown in FIGS. 1 through 4 will be described as having one activated reflective surface which provides the doppler frequency shifts and at least two rigid reflective surfaces that reflect the incoming signal radiation onto the activated reflective surface, and then reflects the doppler-shifted signals back to the search signal's emitter. It should be noted that two or more surfaces out of each group of reflective surfaces that comprise one retroreflective device may be activated. The reflective surfaces are preferably made of metallic or specular material. The search signals emitter preferably transmits at a frequency somewhere between 1 GHz and 10 GHz but is not limited thereto, and all the activated reflective surfaces modulate the search signal at audio frequencies, predominantly from 1 KHz to 10 KHz to properly simulate target movement. The incoming beams projected into each retroreflective device from the doppler radar may be as much as 20° off the optical axis of the device, i.e., within 20° of the field-of-view of the transmitter, and a rough parallelism of the return signal with that of the incoming signal, especially in the microwave bands, can still exist. It is therefore proper that if retroreflectance is desired for an aspect angle of more than 20°, or even up to 360°, a plurality of retroreflective devices mounted together in a cluster may be used.

According to FIG. 1 an incoming doppler radar search signal 15 is first reflected off one of the rigid metallic surfaces 11 of the trihedral retroreflector onto the activated reflective surface 12. Surface 12 may be a metallic membrane which may be activated by a sound generator or loudspeaker, represented by numeral 13, which may be mounted on the lower side of the membrane and which produces a set of vibrational waves, represented by numeral 14, on the membrane. The vibrational waves 14 combine with the incoming doppler radar search signal 15 to provide a doppler-shift on the reflected return search signal 16 which includes a superposed, phase shifted, or doppler-shifted, wave front to represent movement of the retroreflective device, even though only the activated surface 12 of the retroreflective device has moved. The length of all the three sides are preferably equal and vary from 5 centimeters to 15 centimeters. It should be noted that the activated reflective surface 12 may be rotated in its own plane rather than vibrated, or a combination of both motions. However, if rotational motion is used, the center axis of rotation must be outside of the view as shown so that all of the reflective surface is rotated in the same direction.

The embodiment of FIG. 2 illustrates another vibrationally activated reflective surface. In this case, a metallized energy concentrating funnel or horn retroreflector has a rigid exterior wall of horn body 21 from which the incoming radar search signal beam 26 is reflected onto activated reflective surface 25 and retroreflects the outgoing search signal 27, which is phase-shifted by the modulation of surface 25. The activated reflective surface 25 is perceived to be a reflector plate in the center of the horn 21. The reflector plate is vibrated at a known frequency and intensity by an electro-acoustic means, such as by current flowing in the voice coil 23 of a permanent magnet 22 loudspeaker system 24. The reflector plate is connected along its outer edge to the voice coil 23. The diameter across the end of the horn is about 15 centimeters. The horn is exponential and acts like an energy concentrating funnel with a 90° or smaller opening. Even if the emitter, or doppler radar transmitter, is positioned 20° off the optical axis of the horn retroreflector, parallelism between most of the incoming signal 26 and the outgoing signal 27 will continue to exist.

FIG. 3 shows a parabolic dish retroreflector 30 which is preferably about 15 centimeters diameter across the open front. In this case the activated reflective surface is one of the reflective surfaces of a rotating metallic, or metal covered, vane 31 which is positioned with its spin axis 36 close to but not on the focal point 32 of the parabolic retroreflector. Even though the vane 31 spin axis is shown along parabola optical axis 38, it does not necessarily have to be on axis 38, but must be displaced enough from the focal point 32 so that the vane reflecting surfaces intersect with the incoming beam. Two incoming search signal beams 33 are shown with their respective outgoing signal beams 34. The two different signal paths are shown to illustrate that a vane with four extended reflective surfaces as shown, but not limited thereto, retroreflects the incoming beams and further provides a doppler-shift thereto that accompanies each outgoing signal beam 34. When vane 31 spins at about 100 cycles per second and has extended reflecting surfaces 1 centimeter wide at the focal region 32, the corresponding doppler-shift equals a target moving at about 6 miles per hour. It should be noted that the drive axis for vane 31 may pass through the sides of 30 with the vane 31 being very narrow about the focal region 32.

Figure 4:
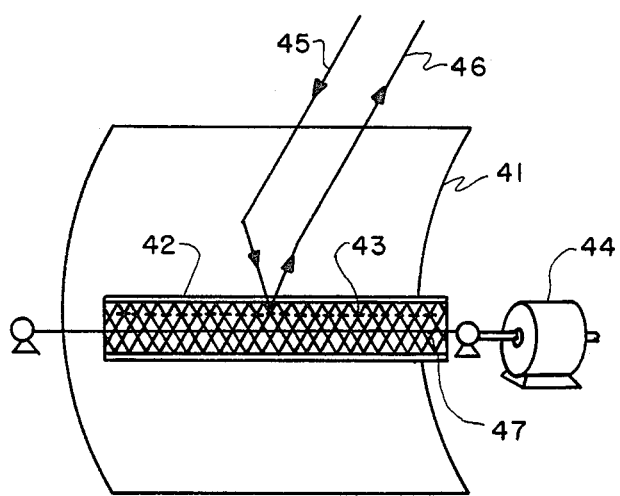
FIG. 4 shows a parabolic cylinder retroreflective device again using the rotating vane modulator.

FIG. 4 shows a collecting cylinder surface, or parabolic cylinder 41, embodiment of the present invention. In this case, the vane 42 may be the full length of the cylinder and have its spin axis 47 slightly offset from the focal region 43 of parabolic cylinder 41. Vane 42 may be driven by a high speed electric motor 44. The vane 42 is shown as comprised of a flat piece of perforated reflective material, such as screen wire mesh, instead of solid metal. The extension on each side of vane 42 from axis 47 is preferably at least 1 centimeter, and the distance across the outer curved surfaces of 41 is preferably about 15 centimeters. Numeral 45 represents the incoming beam and numeral 46 represents the outgoing signal beam, which of course has the doppler-shift included therein. The wire mesh is shown as being enlarged at the focal region 43 to better illustrate the relative positions of axis 47 from region 43.

While there have been described and illustrated several specific embodiments of the invention, it will be clear that modifications and variations will be apparent to those skilled in the art in light of the foregoing description and may be made without departing from the true spirit and scope of the invention as defined in the appended claims.

It should be understood that rough parallelism of the return signal with that of the incoming signal exists in all the embodiments with the return signal 27 of FIG. 2 shown diverging from the incoming signal 26 used as a specific illustration thereof.

I claim:

1. A retroreflector system for superposing doppler-shifted signals of known magnitudes on retroreflected carrier signals received from a doppler radar source, said system comprising:

a retroreflector device comprised of a parabolic dish having an activated reflective surface and a modulating means for movement thereof wherein said activated reflective surface is comprised of a rotatable metallic vane positioned with its spin axis close to the focal region of said parabolic dish and its length extending slightly past each side of the focal region wherein the extended reflective surfaces of said rotating metallic vane form said activated reflective surface in which each of said extended reflective surfaces are rotatable through said focal region to impose a doppler-shift frequency on the original carrier signals received from which is focused thereon from said parabolic dish and is reemitted from said retroreflective device back from said parabolic dish in which said doppler-shifted signals may be analyzed by said doppler radar signal source in terms of velocity and target-simulated linear motion wherein said parabolic dish is 15 centimeters diameter across the open front and wherein said rotatable metallic vane has four evenly spaced extended reflective surfaces 1 centimeter wide at said focal region.

2. A system as set forth in claim 1 wherein said rotatable metallic-vane is made of perforated reflective material.

3. A retroreflector system for superposing doppler-shifted signals of known magnitudes on retroreflected carrier signals received from a doppler radar signal source, said system comprising:

a retroreflective device comprised of a collecting cylinder surface having an activated reflective surface and a modulating means for movement thereof wherein said activated reflective surface is comprised of a rotatable metallic vane positioned along the length of said cylinder positioned with its spin axis close to the focal region of said cylinder wherein the extended reflective surfaces of said rotatable metallic vane form said activated reflective surface in which each of said extended reflective surfaces rotate through said focal region to impose a doppler-shift frequency on the original carrier signals received from said signal source which is focused thereon from said collecting cylinder and is reemitted from said reflective device back from said collecting cylinder surface in which said doppler-shifted signals may be analyzed by said doppler radar signal source in terms of velocity and target-simulated linear motion wherein said collecting cylinder surface is 15 centimeters across the outer curved surfaces and wherein said rotatable metallic vane is a flat piece of perforated reflective material with the extension of each side from said focal region is at least 1 centimeter.

* * * * *